United States Patent
Ikeda et al.

(10) Patent No.: US 10,998,704 B2
(45) Date of Patent: May 4, 2021

(54) ELECTRICAL CONNECTION BOX AND WIRE HARNESS

(71) Applicant: Yazaki Corporation, Tokyo (JP)

(72) Inventors: Tatsuhiko Ikeda, Makinohara (JP); Takaaki Kakimi, Makinohara (JP); Tetsuya Kato, Makinohara (JP); Ko Fujimoto, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 119 days.

(21) Appl. No.: 16/358,879

(22) Filed: Mar. 20, 2019

(65) Prior Publication Data
US 2019/0348825 A1 Nov. 14, 2019

(30) Foreign Application Priority Data
May 8, 2018 (JP) .............................. JP2018-089716

(51) Int. Cl.
| | | |
|---|---|---|
| *H02G 3/08* | (2006.01) | |
| *B60R 16/02* | (2006.01) | |
| *H01B 7/00* | (2006.01) | |
| *H02G 3/14* | (2006.01) | |

(52) U.S. Cl.
CPC ......... *H02G 3/083* (2013.01); *B60R 16/0207* (2013.01); *B60R 16/0215* (2013.01); *H01B 7/0045* (2013.01); *H02G 3/081* (2013.01); *H02G 3/14* (2013.01)

(58) Field of Classification Search
CPC ........ H02G 3/014; H02G 3/081; H02G 3/083; H02G 3/088; B60R 16/0207; B60R 16/0215; H01B 7/0045
See application file for complete search history.

(56) References Cited

U.S. PATENT DOCUMENTS

| | | | | |
|---|---|---|---|---|
| 7,622,674 B2* | 11/2009 | Kanamaru | ............. | H05K 7/026 174/50 |
| 7,893,364 B2* | 2/2011 | Oda | ....................... | H05K 7/026 174/520 |
| 9,743,545 B2* | 8/2017 | Nakashima | ......... | H02G 3/0691 |
| 10,770,878 B1* | 9/2020 | Nakashima | ......... | B60R 16/0239 |

(Continued)

FOREIGN PATENT DOCUMENTS

JP 2010-259149 A 11/2010

*Primary Examiner* — Steven T Sawyer
*Assistant Examiner* — Paresh H Paghadal
(74) *Attorney, Agent, or Firm* — Sughrue Mion, PLLC

(57) ABSTRACT

An electrical connection box includes a housing including a frame and a lower cover configured to be fitted to the frame in a fitting direction. At least part of the frame and at least part of the lower cover form a tubular lead-out portion. An axial direction of the lead-out portion extends along the fitting direction, and the lead-out portion allows a wire harness to be pulled out through the lead out portion, the wire harness including an end portion that is to be disposed in an inside of the housing. The lead-out portion includes harness contact portions formed on an inner peripheral surface of the lead-out portion and configured to contact the wire harness. The harness contact portions extend along the fitting direction and are spaced from one another in a circumferential direction of the lead-out portion.

9 Claims, 13 Drawing Sheets

(56) References Cited

U.S. PATENT DOCUMENTS

| | | | | |
|---|---|---|---|---|
| 2008/0303272 | A1* | 12/2008 | Takahashi | F16L 25/0045 |
| | | | | 285/305 |
| 2012/0018185 | A1* | 1/2012 | Sato | B60R 16/0238 |
| | | | | 174/50 |
| 2012/0285728 | A1* | 11/2012 | Sakai | H02G 3/0691 |
| | | | | 174/152 G |
| 2017/0085067 | A1* | 3/2017 | Sugimoto | H01R 13/5812 |
| 2018/0013276 | A1* | 1/2018 | Ikeda | H01R 9/2416 |
| 2020/0176961 | A1* | 6/2020 | Tomita | H02G 3/083 |

* cited by examiner

ELECTRICAL CONNECTION BOX AND WIRE HARNESS

CROSS-REFERENCES TO RELATED APPLICATIONS

This application is based on and claims priority from Japanese Patent Application No. 2018-089716 filed on May 8, 2018, the entire contents of which are incorporated herein by reference.

FIELD

One or more embodiments of the present invention relate to an electrical connection box in which a lead-out portion is formed in a housing. One or more embodiments of the present invention also relate to a wire harness which is pulled out from the housing via the lead-out portion.

BACKGROUND

An electrical connection box mounted on an automobile is configured to include a housing for accommodating an electronic component block (see, for example, JP-A-2010-259149). The housing is provided with a frame having an open top and bottom, an upper cover covering an upper opening portion of the frame, and a lower cover covering a lower opening portion of the frame. The electrical connection box is provided in a wire harness having an end portion disposed inside the housing. At the bottom of the housing, a lead-out portion is formed as a pulled-out portion of the wire harness. The lead-out portion is formed in a tubular shape extending straight downward from the bottom of the housing. The lead-out portion is formed in two, one extending from the frame and the other extending from the lower cover.

SUMMARY

In the above related art, the wire harness is pulled out downward from the frame, and thereafter the lower cover is moved upward and assembled such that the lower cover is fitted to the frame. Therefore, there is a concern that the inner peripheral surface of the lead-out portion on the lower cover side strongly rubs the outer surface of the wire harness when the lower cover is moved upward, and in that case, scratching or the like occurs.

One or more embodiments of the present invention have been made in view of the above circumstances, and an object thereof is to provide an electrical connection box capable of preventing scratching or the like when the lower cover is assembled. Further, another object is to provide a wire harness including the electrical connection box in the configuration thereof.

One or more embodiments of the present invention provide an electrical connection box including: a housing including a frame and a lower cover configured to be fitted to the frame in a fitting direction, wherein at least part of the frame and at least part of the lower cover form a lead-out portion having a tubular shape and protruding toward an outside of the housing, wherein an axial direction of the lead-out portion extends along the fitting direction, and the lead-out portion allows a wire harness to be pulled out through the lead out portion, the wire harness including an end portion that is to be disposed in an inside of the housing, wherein the lead-out portion includes a plurality of harness contact portions formed on an inner peripheral surface of the lead-out portion and configured to contact the wire harness, and wherein the plurality of harness contact portions extend along the fitting direction and are spaced from one another in a circumferential direction of the lead-out portion.

With this configuration, since the contact area with respect to the wire harness does not extend over the entire inner peripheral surface of the lead-out portion but limited to the harness contact portions formed on the inner peripheral surface, the contact area is reduced, and as a result, it is possible to prevent scratching or the like from when the lower cover is assembled.

One or more embodiments of the present invention may provide the electrical connection box described above, wherein the lead-out portion includes a base end and a distal end in the axial direction, the distal end being opened toward the outside of the housing, wherein a plurality of recessed portions are formed in the inner peripheral surface and adjacent to the plurality of harness contact portions in the circumferential direction, and wherein the plurality of recessed portions are formed in a range from an opening edge of the distal end to an intermediate portion between the distal end and the base end in the axial direction, and are recessed toward an outer side in a radial direction of the lead-out portion relative to radially inner ends of the plurality of harness contact portions.

With this configuration, it is possible to achieve the prevention of scratching or the like with a simple structure.

One or more embodiments of the present invention may provide the electrical connection box described above, wherein one of the plurality of recessed portions has a cut portion recessed in a range from the intermediate portion to the base end in the axial direction and configured to communicate with the inside of the housing.

With this configuration, it is possible to have the drainage function in the lead-out portion while preventing the scratching or the like.

One or more embodiments of the present invention provide the electrical connection box described above, wherein the lead-out portion includes a first lead-out portion formed in the frame and a second lead-out portion formed in the lower cover, and wherein the first lead-out portion includes: a band-assembling portion to which a band member configured to fix the wire harness to the inner peripheral surface is assembled; and a tape-winding portion having an outer diameter in the radial direction larger than that of the band-assembling portion and configured to receive a tape that is wound from the lead-out portion to the wire harness in the axial direction.

With this configuration, winding of the tape from the lead-out portion to the wire harness can be performed with good workability. The operation will be described in detail in the section of detailed description.

One or more embodiments of the present invention provide a wire harness including: the above-described electrical connection box provided at the end portion of the wire harness to be wired to an automobile.

With this configuration, it is possible to provide a better wire harness because the wire harness is provided with an electrical connection box capable of preventing scratching or the like when the lower cover is assembled.

According to the electrical connection box of one or more embodiments of the present invention, it is possible to prevent scratching or the like when the lower cover is assembled. According to the wire harness of one or more embodiments of the present invention, it is possible to provide a better product.

BRIEF DESCRIPTION OF DRAWINGS

FIGS. 11A, 11B, and 11C are views illustrating the outlet structure when a diameter of the wire harness is small, wherein FIG. 11A is a cross-sectional view of the wire harness, FIG. 11B is a perspective view of the outlet structure, and FIG. 11C is a perspective view of the lead-out portion (Example 2);

FIGS. 12A, 12B, 12C, and 12D are views of a comparative example with respect to FIGS. 11A to 11C, wherein FIGS. 12A and 12B are cross-sectional views of the wire harness, FIG. 12C is a perspective view of the outlet structure, and FIG. 12D is a perspective view of the lead-out portion; and FIGS. 13A, 13B, and 13C are views of a comparative example with respect to FIGS. 11A to 11C, wherein FIGS. 13A and 13B are cross-sectional views of the wire harness, and FIG. 13C is a perspective view of the outlet structure.

DETAILED DESCRIPTION

In an embodiment of the present invention, a wire harness wired to an automobile includes an electrical connection box provided at an end portion of the wire harness. The electrical connection box is configured to include an electronic component block to which a plurality of electronic components are assembled and a housing to be an assembly destination of the electronic component block. The housing includes a frame and a lower cover that covers a lower opening portion of the frame. At the bottom of the housing, a lead-out portion is formed as a pulled-out portion of the wire harness. The lead-out portion is formed in a tubular shape extending straight downward from the bottom of the housing. The lead-out portion is formed in two, one extending from the frame and the other extending from the lower cover. A harness contact portion as a contact portion with respect to the wire harness is formed on an inner peripheral surface of the lead-out portion. The harness contact portion is formed to extend along a fitting direction of the lower cover. The harness contact portion is formed to exist in plural in the circumferential direction of the lead-out portion. On the other hand, a band-assembling portion and a tape-winding portion are formed on an outer peripheral surface of the lead-out portion. The tape-winding portion is formed in a portion that the outer peripheral surface of the lead-out portion bulges outward.

Example 1

Figure 1:
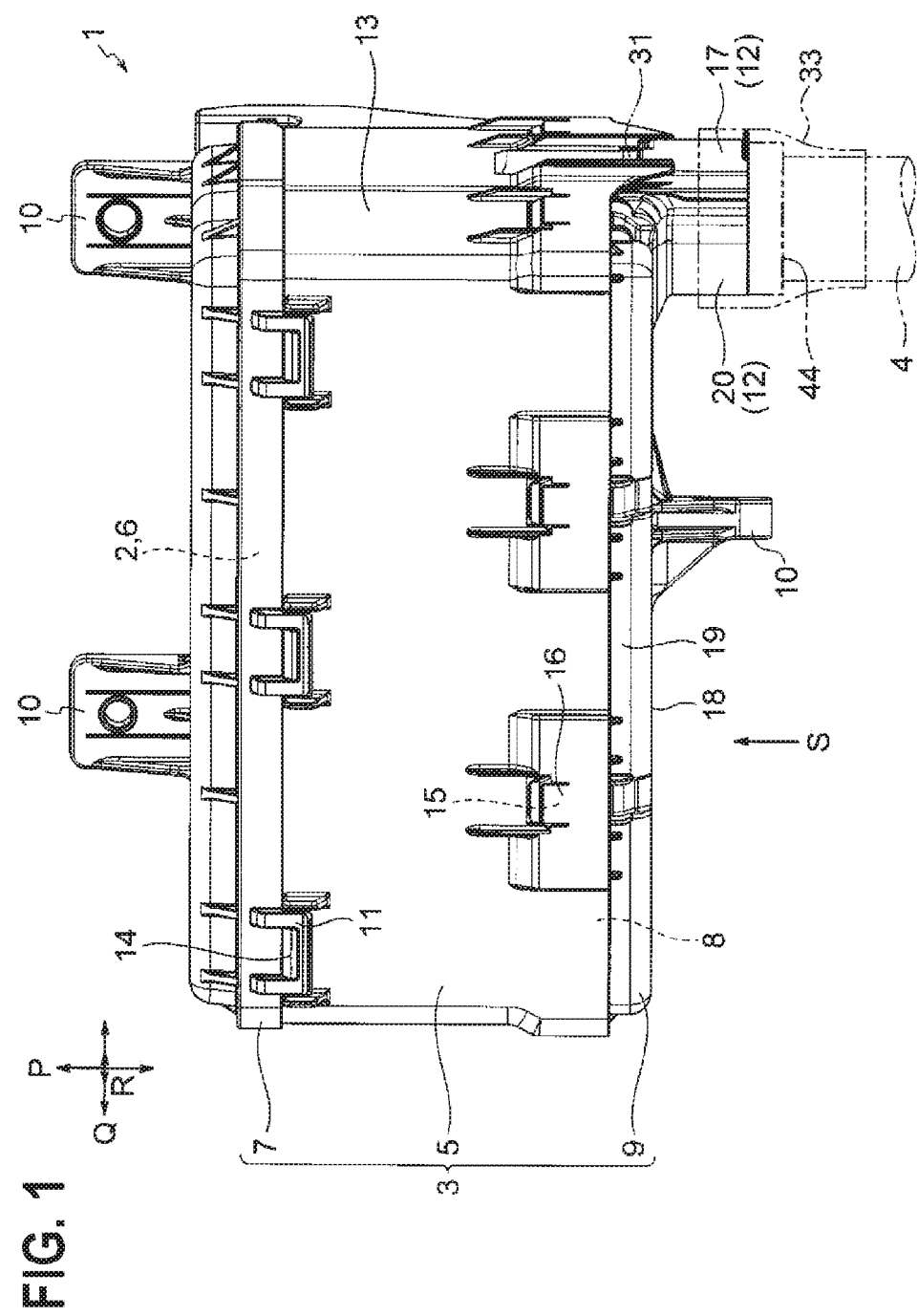
FIG. 1 is a perspective view illustrating an electrical connection box according to an embodiment of the present invention (Example 1)
Figure 2:
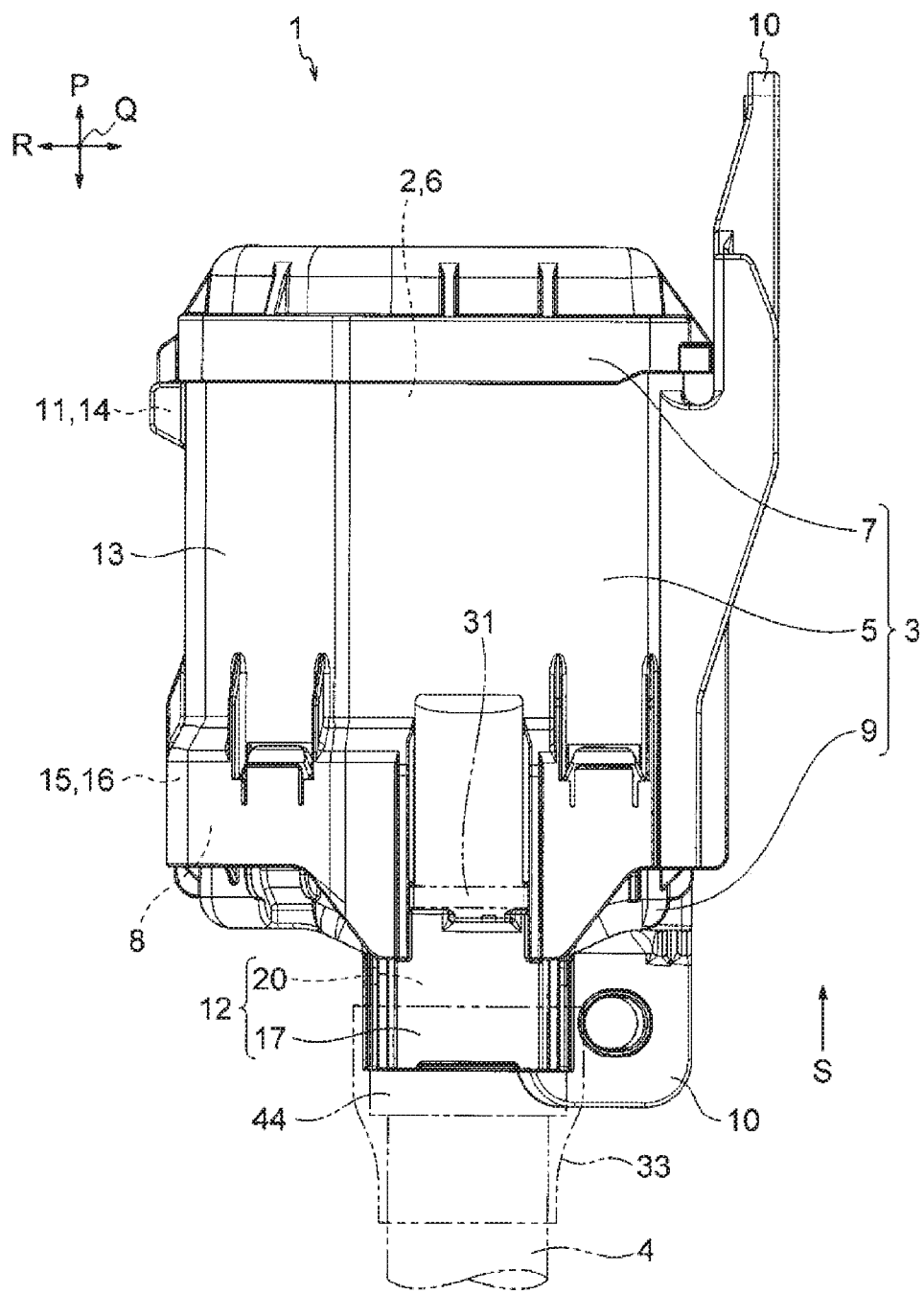
FIG. 2 is a side view of the electrical connection box.
Figure 3:
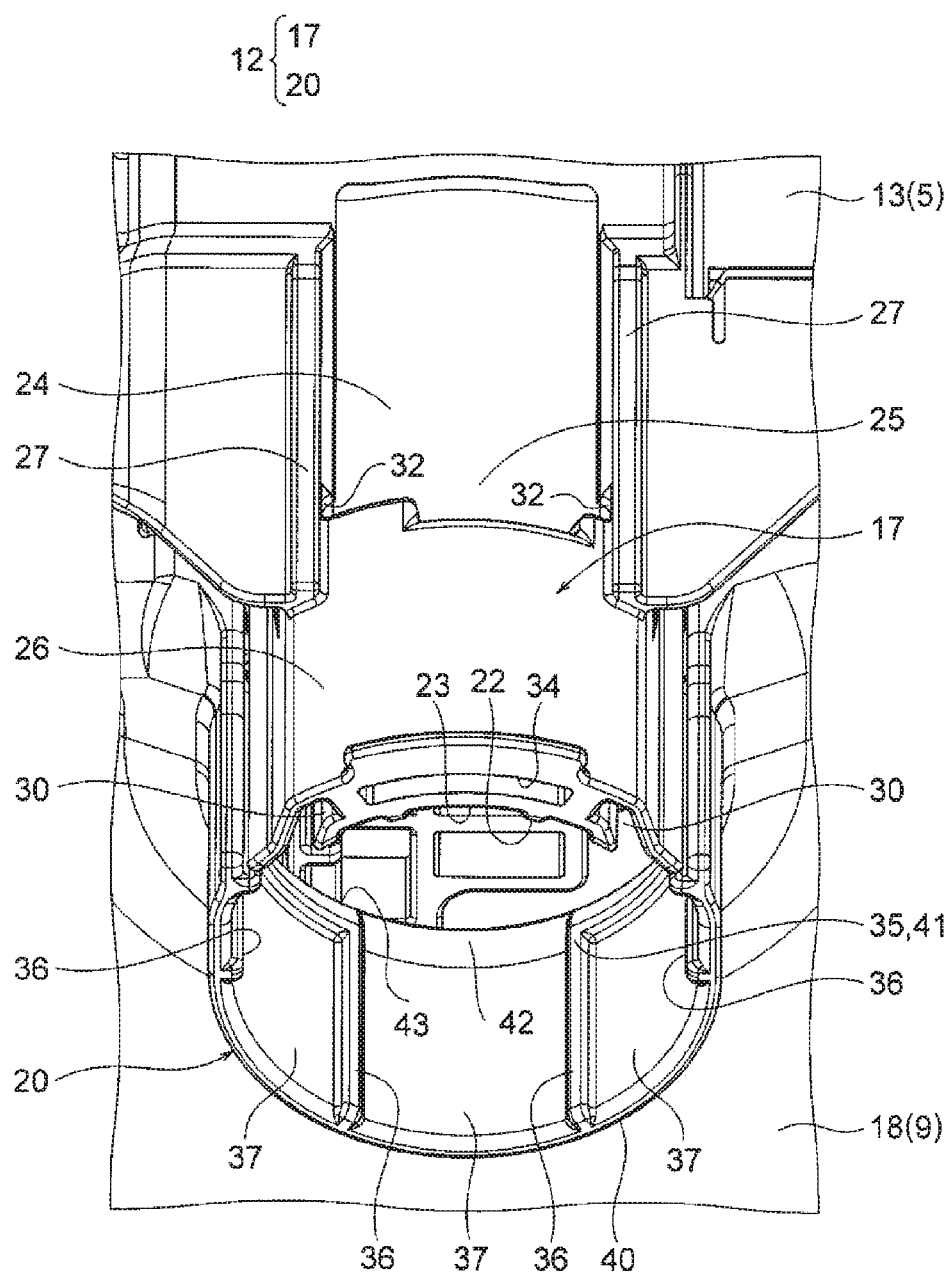
FIG. 3 is a perspective view of a lead-out portion (a perspective view of a second lead-out portion as seen from the inside)
Figure 4:
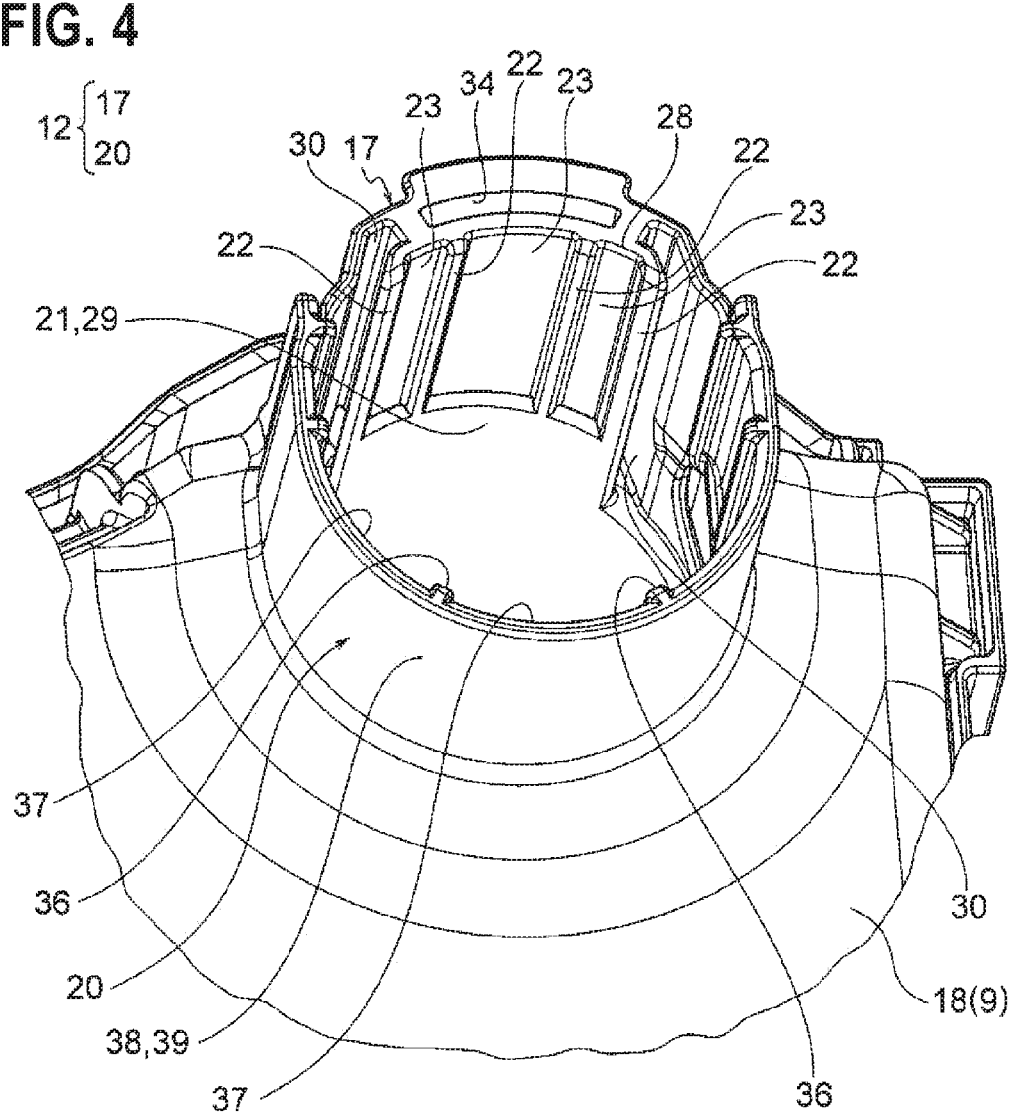
FIG. 4 is a perspective view of a lead-out portion (a perspective view of a first lead-out portion as seen from the inside)
Figure 5:
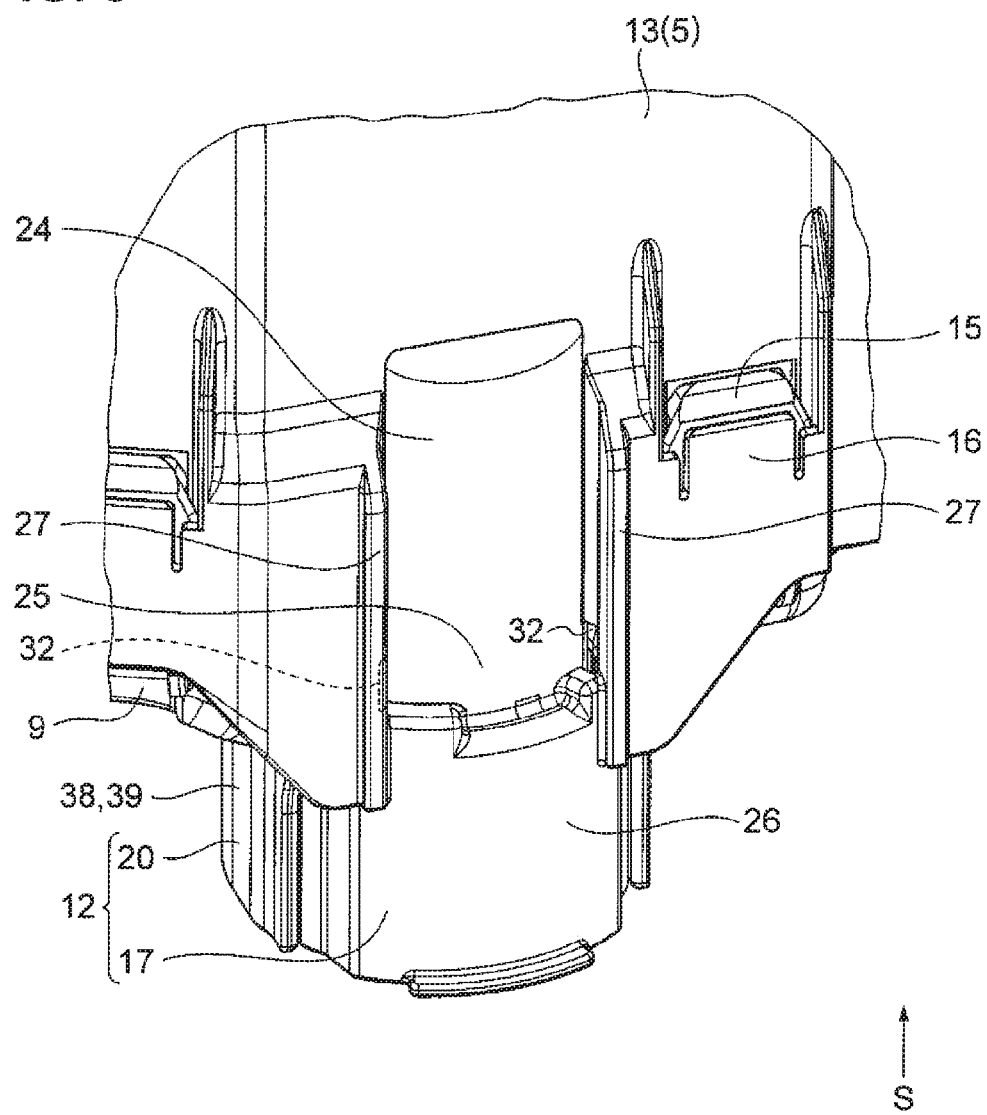
FIG. 5 is a perspective view of the lead-out portion (a perspective view of the first lead-out portion as seen from the outside)
Figure 6:
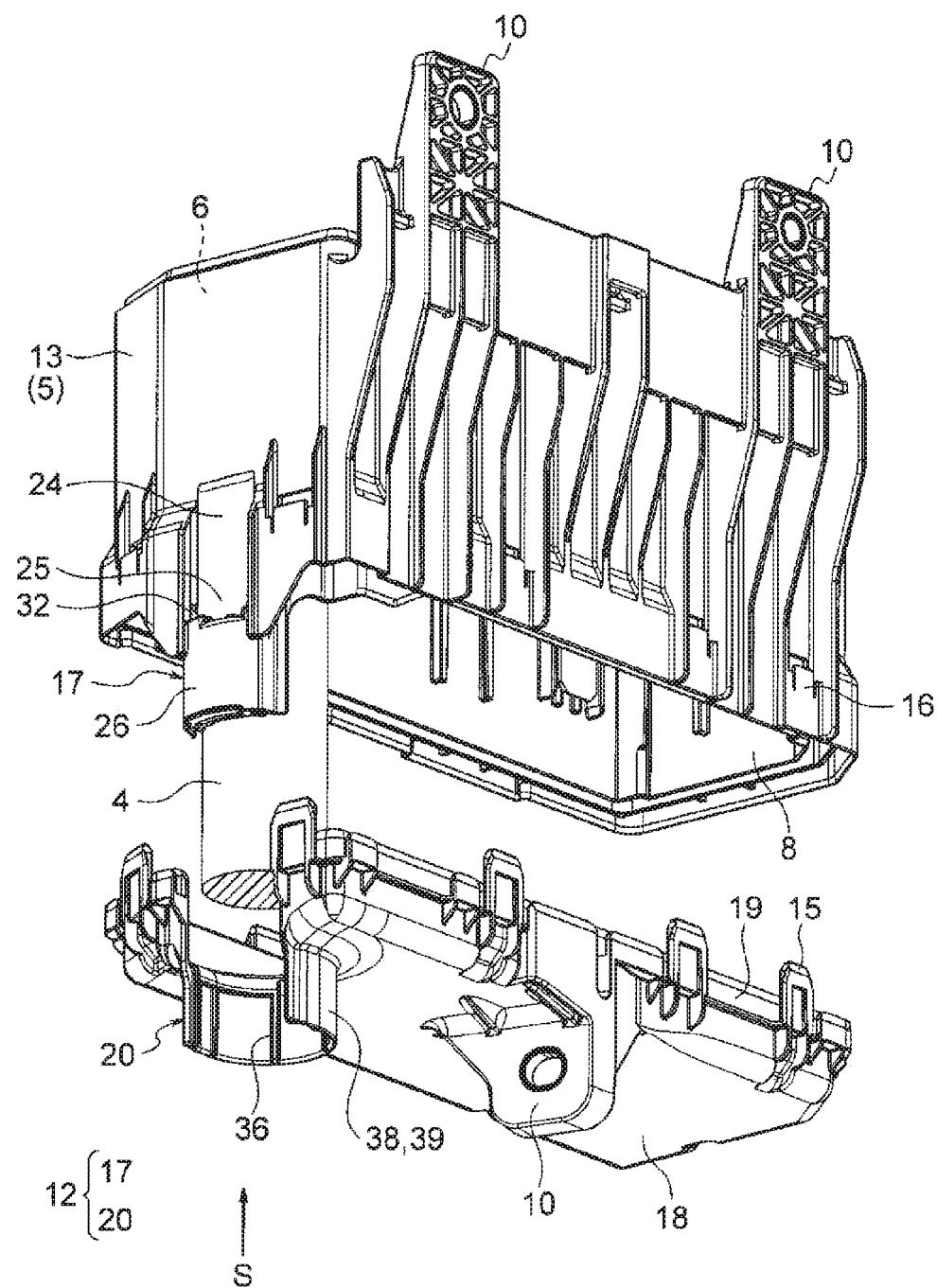
FIG. 6 is a perspective view illustrating a state immediately before a lower cover is assembled.
Figure 7:
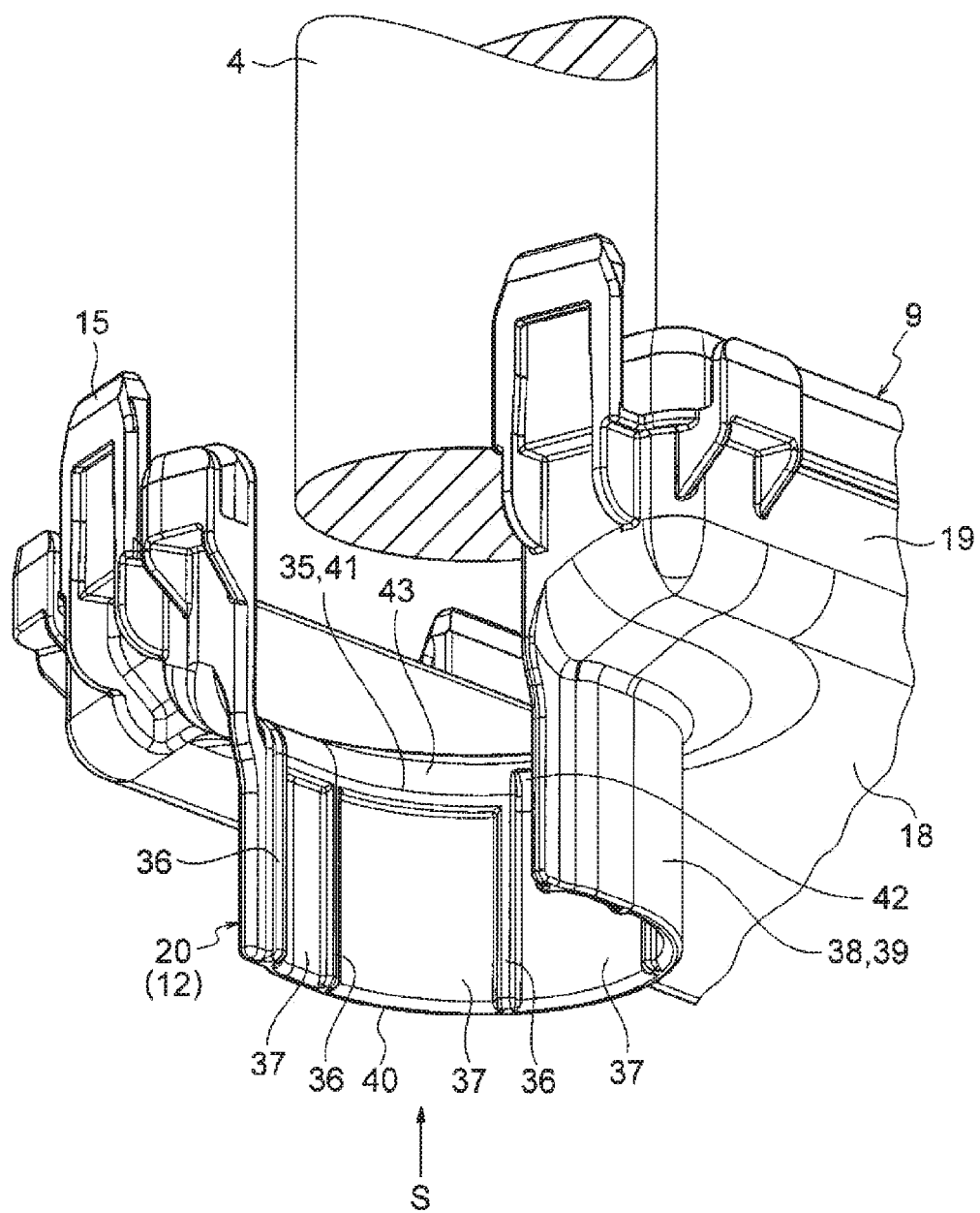
FIG. 7 is an enlarged view of a main part of FIG. 6.
Figure 8:
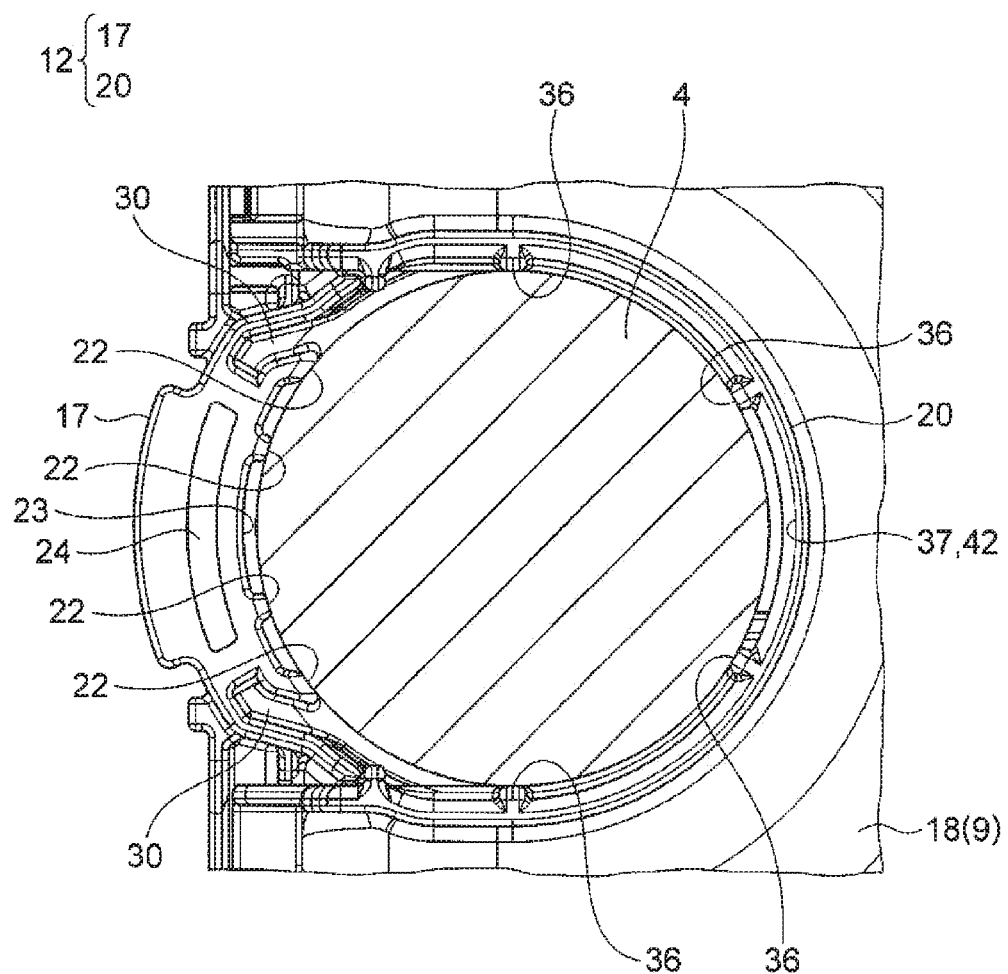
FIG. 8 is a cross-sectional view of a wire harness after the lower cover is assembled.
Figure 9:
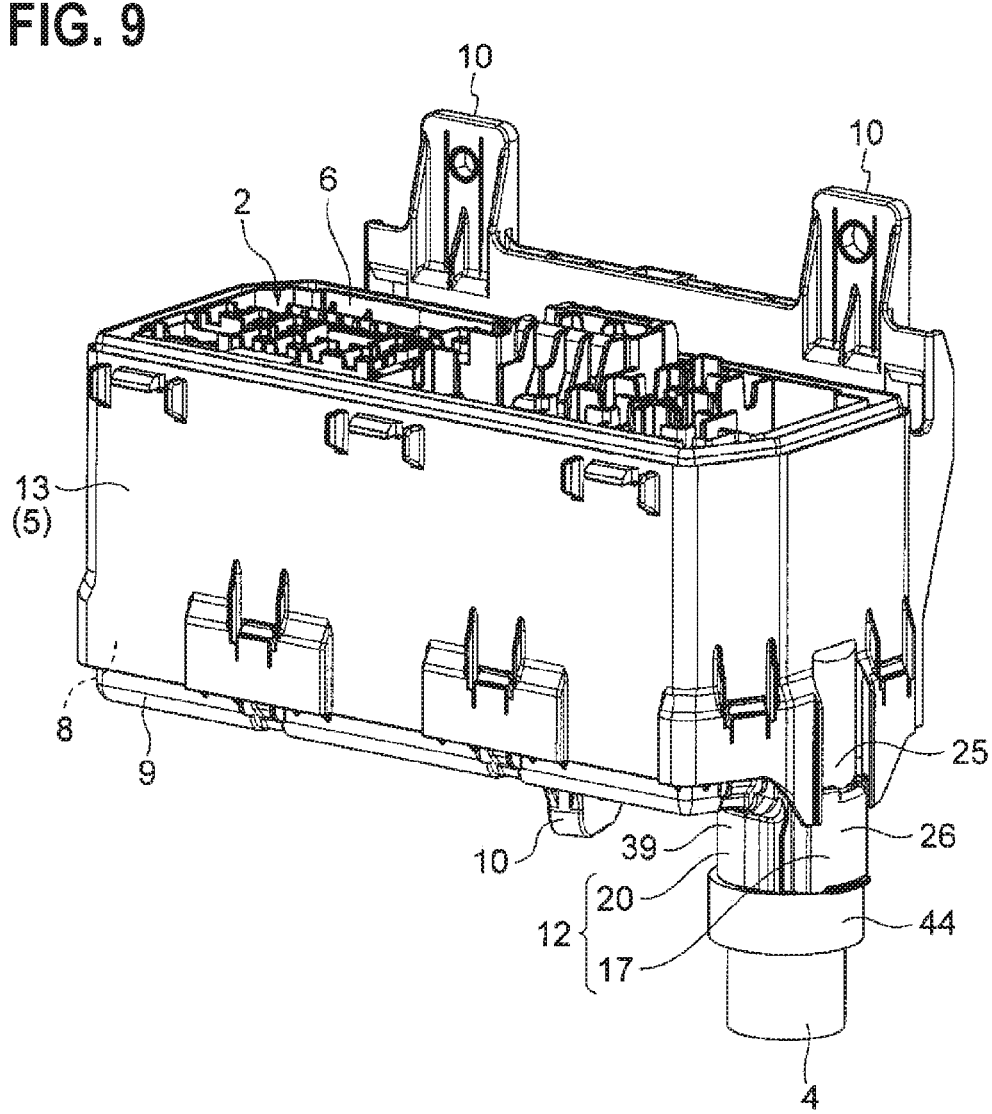
FIG. 9 is a perspective view illustrating an outlet structure of the wire harness.
Figure 10:
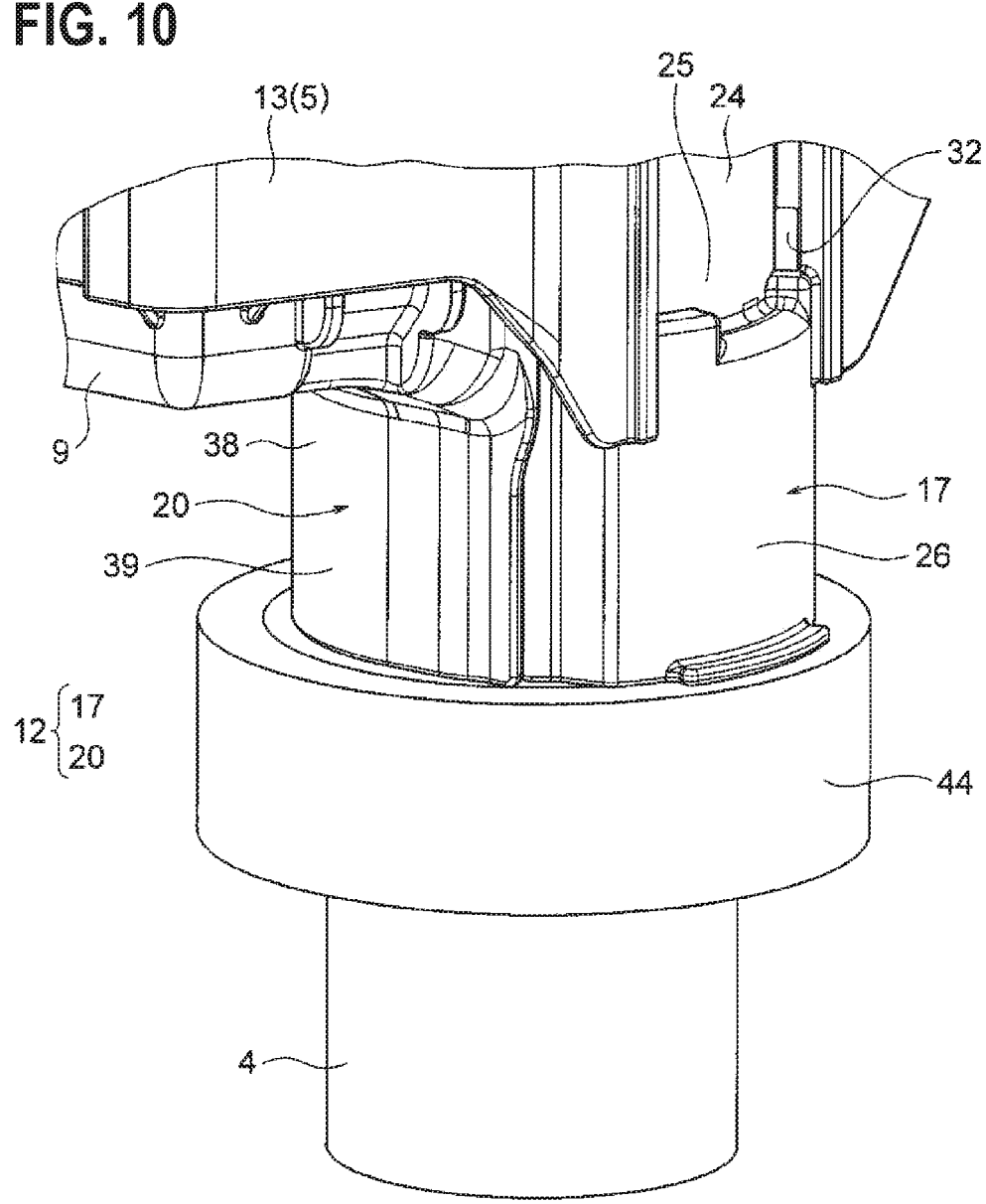
FIG. 10 is an enlarged view of a main part of FIG. 9.

Hereinafter, Example 1 will be described with reference to drawings. FIG. 1 is a perspective view illustrating an electrical connection box according to an embodiment of the present invention. FIG. 2 is a side view of the electrical connection box, FIGS. 3 to 5 are perspective views of a lead-out portion, FIG. 6 is a perspective view illustrating a state immediately before a lower cover is assembled, FIG. 7 is an enlarged view of a main part of FIG. 6, FIG. 8 is a cross-sectional view of a wire harness after the lower cover is assembled, FIG. 9 is a perspective view illustrating an outlet structure of the wire harness, and FIG. 10 is an enlarged view of a main part of FIG. 9. The arrow P in the drawing indicates a vertical direction, the arrow Q indicates a left-right direction, and the arrow R indicates a front-rear direction.

<Configuration of Electrical Connection Box 1>

In FIGS. 1 and 2, an electrical connection box 1 is mounted on a truck in an exposed state to the outside (assumed to be an example). Specifically, the electrical connection box is mounted between a cabin and a loading platform in the truck (assumed to be an example). Such the electrical connection box 1 is configured to include an electronic component block 2 and a housing 3 for accommodating the electronic component block 2. In the electrical connection box 1, an end portion of a wire harness 4 is disposed inside the housing 3, and the wire harness 4 is pulled out from the lower portion. The wire harness 4 is provided with the electrical connection box 1 at a predetermined position of the end portion or the like to be wired to an automobile.

As will be understood from the following description, the electrical connection box 1 has a structure for preventing scratching or the like of the outlet portion with respect to the wire harness 4 and is characterized in this structure.

<Electronic Component Block 2>

In FIG. 9, the electronic component block 2 is provided as a member to which a plurality of electronic components are assembled. The electronic component block 2 is provided as a member in which the electronic components are connected to a predetermined circuit. Specifically, a relay is assembled to a relay assembling portion (reference numeral omitted) made of resin, and a fuse is provided as a member to be assembled to a fuse assembling portion (reference numeral omitted) made of resin (the configuration of the electronic component block 2 is assumed to be an example).

The electronic component block 2 as described above is a cassette type and is detachably assembled to a frame 5 which will be described later. For the electronic component block 2, this name may be read as a cassette block 2.

<Configuration of Housing 3>

In FIGS. 1 and 2, the housing 3 is a combination of members made of resin having insulation properties and specifically, is configured to include the frame 5 to which the electronic component block 2 (see FIG. 9) is detachably assembled, an upper cover 7 for covering an upper opening portion 6 (see FIG. 9) of the frame 5, and a lower cover 9 for covering a lower opening portion 8 (see FIG. 6) of the frame 5. Such the housing 3 is provided with a pair of fixed leg portions 10 and a single fixed leg portion 10. A lead-out portion 12 from which the wire harness 4 is pulled out is provided in the housing 3.

\<Frame 5\>

In FIGS. 1 to 3, the frame 5 is a resin-molded product and includes a frame peripheral wall 13 in which the electronic component block 2 (see FIG. 9) is assembled. On the rear wall of the frame peripheral wall 13, a pair of fixed leg portions 10 and an engaging portion (reference numeral omitted) for rotational movement of the upper cover 7 are formed. On the front wall of the frame peripheral wall 13, a frame-side locking portion 14 with respect to a cover-side locking portion 11 of the upper cover 7 is formed. On the front wall and the rear wall of the frame peripheral wall 13, a frame-side locking portion 16 with respect to a cover-side locking portion 15 of the lower cover 9 is formed. On the right wall of the frame peripheral wall 13, a first lead-out portion 17 constituting the lead-out portion 12 is formed. The first lead-out portion 17 will be described later.

\<Lower Cover 9\>

In FIGS. 1, 2, and 6, the lower cover 9 is a resin-molded product for covering the lower opening portion 8 of the frame 5 as described above and includes a bottom wall 18 and a cover peripheral wall 19. On the bottom wall 18, the single fixed leg 10 and a second lead-out portion 20 constituting the lead-out portion 12 are formed. The cover-side locking portion 15 is formed on the cover peripheral wall 19. The second lead-out portion 20 will be described later.

\<Lead-Out Portion 12\>

In FIGS. 1 to 8, the lead-out portion 12 is a portion from which the wire harness 4 is pulled out as described above and includes the first lead-out portion 17 on the frame 5 side and the second lead-out portion 20 on the lower cover 9 side. The configuration of the lead-out portion 12 is such that the lead-out portion 12 extends over the frame 5 and the lower cover 9. In other words, at least part of the frame 5 and at least part of the lower cover 9 form the lead-out portion 12. Consequently, the lead-out portion 12 is formed in a structure portion that is divided into two. The lead-out portion 12 protrudes toward an outside of the housing 3. In the embodiment, the lead-out portion 12 is formed so as to protrude downward along the fitting direction (see arrow S) of the lower cover 9 with respect to the frame 5. In other words, an axial direction of the lead-out portion 12 extends along the fitting direction. The lead-out portion 12 is formed in a tubular shape. In the present example, the lead-out portion 12 is disposed and formed at the lower right position of the electrical connection box 1 in FIG. 1.

The lead-out portion 12 is formed in view of the maximum diameter of the wire harness 4. In this manner, it is possible to address a situation in which the wire harness 4 having a small diameter is used as in Example 2 described later.

\<First Lead-Out Portion 17\>

In FIGS. 3 to 5, the first lead-out portion 17 is formed in a substantially piece-like wall portion extending downward from the right wall of the frame peripheral wall in an approximately one-third arc shape 13. On an inner peripheral surface 21 side of the first lead-out portion 17, a plurality of harness contact portions 22 and a plurality of recessed portions 23 are formed. On an outer peripheral surface 24 side of the first lead-out portion 17, a band-assembling portion 25, a tape-winding portion 26, and a pair of reinforcing ribs 27 are formed.

\<Harness Contact Portion 22 of First Lead-Out Portion 17\>

In FIG. 4, the harness contact portion 22 is formed as a contact portion with respect to the wire harness 4 (see FIG. 6). The harness contact portion 22 is formed so as to extend along the fitting direction of the lower cover 9 with respect to the frame 5 (see arrow S in FIG. 6). Specifically, the harness contact portion 22 is formed so as to extend straight from an opening edge 28 at a distal end portion of the first lead-out portion 17 to the vicinity of a base end portion 29. The harness contact portion 22 is formed in a rib shape as illustrated in the drawing. In the harness contact portion 22, a portion in contact with the wire harness 4 (a portion of the rib-shaped protruding tip) is disposed and formed at the position of the inner peripheral surface 21. The width (rib width) of the harness contact portion 22 is appropriately set. The harness contact portion 22 is formed in a portion that reduces the contact portion (contact area) of the wire harness 4 in the first lead-out portion 17. The harness contact portion 22 is formed to exist in plural in the circumferential direction of the first lead-out portion 17 (although even one harness contact portion may be used, two or three harness contact portions are more effective in terms of holding the wire harness 4). The plurality of harness contact portions 22 are one of the structures for preventing scratching or the like of the wire harness 4.

\<Recessed Portion 23 of First Lead-Out Portion 17\>

In FIG. 4, the recessed portion 23 is formed by making the inner peripheral surface 21 recessed toward a radially outer side in a range from the opening edge 28 of the first lead-out portion 17 to the vicinity of the base end portion 29 in the axial direction (in a range from the opening edge 28 to the intermediate portion between the distal end portion (the opening edge 28) and the base end portion 29). In other words, the recessed portion 23 is formed in a recessed shape portion slightly thinner than the first lead-out portion 17 from the inner peripheral surface 21 side. A plurality of such recessed portions 23 are formed in the circumferential direction. The recessed portion 23 is formed to allow the harness contact portion 22 to exist in the first lead-out portion 17. The recessed portion 23 is formed adjacent to the harness contact portion 22.

\<Other Portions on Side of Inner Peripheral Surface 21\>

In FIG. 4, reference numeral 30 denotes a pair of slits extending along the fitting direction (see arrow S in FIG. 6). The pair of slits 30 are formed as a portion for passing a band member 31 (see FIG. 2) which will be described later and as a portion for forming a pair of band-inserting holes 32 which will be described later with a mold.

\<Band-Assembling Portion 25\>

In FIGS. 3 and 5, the band-assembling portion 25 is formed as a portion for assembling a band member 31 (see FIG. 2) of a known binding band or the like. The pair of band-inserting holes 32 are formed in the band-assembling portion 25. The pair of band-inserting holes 32 are portions for passing the band member 31 and are formed to partially penetrate the base end portions of the pair of reinforcing ribs 27. The pair of band-inserting holes 32 are formed to penetrate to the pair of slits 30 on the inner peripheral surface 21 side. In the present example, the pair of band-inserting holes 32 are disposed and formed in a continuous portion of the band-assembling portion 25 and the tape-winding portion 26.

\<Tape-Winding Portion 26\>

In FIGS. 3 and 5, the tape-winding portion 26 is formed as a winding portion of a tape 33 (see FIGS. 1 and 2) which is wound from the lead-out portion 12 to the wire harness 4. As will be understood from the following description and the description of Example 2, the tape-winding portion 26 is formed in a portion which is not a mere winding portion of the tape 33 but in which the outer peripheral surface 24 of the first lead-out portion 17 bulges outward as compared with the band-assembling portion 25. In other words, the tape-winding portion 26 has an outer diameter in the radial direction larger than that of the band-assembling portion 25. In order to form the outwardly bulging tape-winding portion 26, a thickness-reduction portion 34 (see FIG. 4) is formed in the first lead-out portion 17 as a portion for stabilizing the shape immediately after molding.

<Second Lead-Out Portion 20>

In FIGS. 3 to 5, the second lead-out portion 20 is formed in a wall portion extending downward from the right end of the bottom wall 18 of the lower cover 9 in an approximately two-thirds arc shape (substantially C shape). A plurality of harness contact portions 36 and a plurality of recessed portions 37 are formed on an inner peripheral surface 35 side of the second lead-out portion 20. On the side of an outer peripheral surface 38 of the second lead-out portion 20, a tape-winding portion 39 is formed.

<Harness Contact Portion 36 of Second Lead-Out Portion 20>

In FIG. 3, the harness contact portion 36 is formed as a contact portion with respect to the wire harness 4 (see FIG. 6). The harness contact portion 36 is formed to extend along the fitting direction of the lower cover 9 with respect to the frame 5 (see arrow S in FIG. 6). Specifically, the harness contact portion 36 is formed to extend straight from an opening edge 40 of the second lead-out portion 20 to the vicinity of a base end portion 41. The harness contact portion 36 is formed in a rib shape as illustrated in the drawing. In the harness contact portion 36, a portion in contact with the wire harness 4 (a portion of the rib-shaped protruding tip) is disposed and formed at the position of the inner peripheral surface 35. The width (rib width) of the harness contact portion 36 is appropriately set. The harness contact portion 36 is formed in a portion that reduces the contact portion (contact area) of the wire harness 4 in the second lead-out portion 20. The harness contact portions 36 are formed to exist in plural in the circumferential direction of the second lead-out portion 20. The plurality of harness contact portions 36 are one of the structures for preventing scratching or the like of the wire harness 4.

<Recessed Portion 37 of Second Lead-Out Portion 20>

In FIG. 3, the recessed portion 37 is formed by making the inner peripheral surface 35 recessed in a range from the opening edge 40 of the second lead-out portion 20 to the vicinity of the base end portion 41 (in the range of the intermediate portion from the opening edge 40). In other words, the recessed portion 37 is formed in a recessed shape portion slightly thinner than the second lead-out portion 20 from the inner peripheral surface 35 side. A plurality of such recessed portions 37 are formed in the circumferential direction. The recessed portion 37 is formed to allow the harness contact portion 36 to exist in the second lead-out portion 20. The recessed portion 37 is formed adjacent to the harness contact portion 36. A cut portion 42 is formed in one of the plurality of recessed portions 37.

<Cut Portion 42>

In FIG. 3, the cut portion 42 is formed in a recessed portion of the base end portion 41 of the second lead-out portion 20. The cut portion 42 is formed in a portion that communicates with the inside of the housing 3 (the inside of the lower cover 9). The cut portion 42 is formed in a portion to an extent that moisture accumulated inside the lower cover 9 in an extremely small amount can be discharged. In the present example, the cut portion 42 is disposed and formed in the middle of the recessed portion 37 of the second lead-out portion 20 (the disposition is assumed to be an example and may be adjusted to a position to be easy to drain).

<Other Portions on Side of Inner Peripheral Surface 35>

In FIG. 3, a curved surface 43 is formed in the base end portion 41 of the second lead-out portion 20. The curved surface 43 is formed on a surface allowing to contact with the outer surface of the wire harness 4 (see FIG. 6) when the lower cover 9 is assembled.

<Tape-Winding Portion 39>

In FIGS. 4 and 5, the tape-winding portion 39 is formed as a winding portion of the tape 33 (see FIGS. 1 and 2) wound from the lead-out portion 12 to the wire harness 4.

<Assembly of Lower Cover 9>

In FIG. 6, assembling is performed such that the wiring harness 4 is first pulled out downward from the frame 5. At this time, since the portion of the wire harness 4 contacting with the inner peripheral surface 21 of the first lead-out portion 17 is small and there is no rubbing here, it is a matter of course that the outer surface of the wire harness 4 is not scratched. After the wire harness 4 is pulled out, the wire harness 4 is fixed to the first lead-out portion 17 by the band member 31.

Next, the assembly is performed such that the lower cover 9 is moved upward, and the lower cover 9 is fitted to the frame 5. At this time, the inner peripheral surface 35 of the second lead-out portion 20 on the lower cover 9 side contacts with the outer surface of the wire harness 4, but as illustrated in FIGS. 7 and 8, since the inner peripheral surface 35 of the second lead-out portion 20 has a smaller portion contacting with the wire harness 4, it is a matter of course that scratch-causing rubbing hardly occurs in the outer surface of the wire harness 4. Due to the structure of the lead-out portion 12, scratching or the like of the outlet portion on the wire harness 4 is prevented.

In FIGS. 9 and 10, after the lower cover 9 is assembled, assembling is performed such that a belt-like rubber foam 44 is wound around the outer surface of the wire harness 4. For example, since the rubber foam 44 is formed by foaming EPDM rubber as a main component and processing the rubber so that the rubber can be used as a sealing material, the rubber foam 44 is wound to conceal the gap between the lead-out portion 12 and the wire harness 4 at the pulled-out portion of the wire harness 4. The rubber foam 44 is crushable in the radial direction of the wire harness 4.

In FIGS. 1 and 2, finally, when the tape 33 is wound from the lead-out portion 12 to the wire harness 4 (so-called tape winding is performed), a series of assembling on the lower side is completed.

<Effects of Electrical Connection Box 1 and Wire Harness 4>

As described above with reference to FIGS. 1 to 10, according to the electrical connection box 1 which is one embodiment of the present invention, since the contact portion with respect to the wire harness 4 is not the entire inner peripheral surface of the lead-out portion 12, but a plurality of harness contact portions 22 and 36 formed on the inner peripheral surfaces 21 and 35, the contact portion is remarkably reduced, and as a result, it is possible to prevent scratching or the like when the lower cover 9 is assembled.

According to the electrical connection box 1, since the harness contact portions 22 and 36 can be formed by the plurality of recessed portions 23 and 37, it is also possible to achieve the effect of preventing scratching and the like with a simple structure. According to the electrical connection box 1, since the lead-out portion 12 includes the cut portion 42, it is also possible to have the drainage function in the lead-out portion 12 while preventing the above-mentioned scratching and the like.

To briefly describe drainage, moisture reaches the portion around which the tape 33 is wound via the cut portion 42 and is drained in a state of oozing out from the minute gap of the winding portion. This is an example of drainage.

Besides this, according to the wiring harness 4, it is possible to provide the electrical connection box 1 capable of preventing scratching or the like when the lower cover 9 is assembled.

Example 2

Figure 11A:
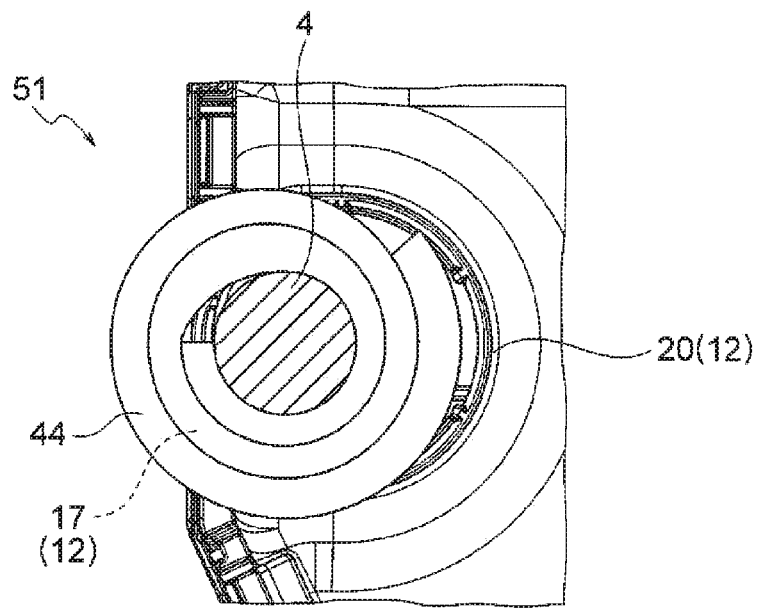
Figure 11B:
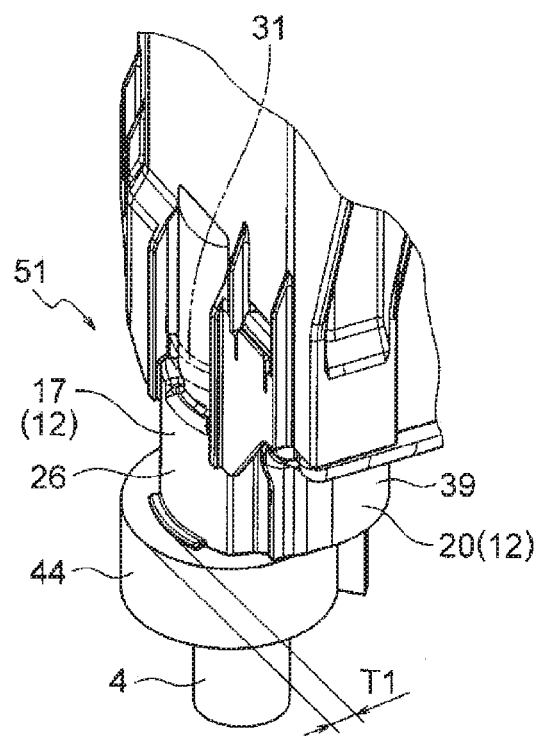
Figure 11C:
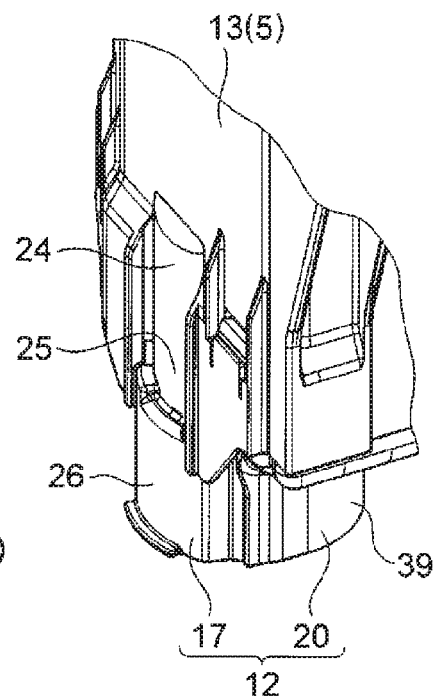

Hereinafter, Example 2 will be described with reference to drawings. FIGS. 11A, 11B, and 11C are views illustrating the outlet structure when the diameter of a wire harness is small. FIGS. 12A to 12D and 13A to 13C are views of comparative examples with respect to FIGS. 11A to 11C. Components that are basically the same as those in Example 1 are denoted by the same reference numerals, and a detailed description thereof will be omitted.

<Outlet Structure 51>

In FIGS. 11A to 11C, an outlet structure 51 when the diameter of the wire harness 4 is smaller than that of Example 1 is as follows. That is, when the diameter of the wire harness 4 is smaller than that of Example 1, for example, due to variations of the electrical connection box 1 or the like, the rubber foam 44 is wound more than in Example 1 in order to conceal the gap between the lead-out portion 12 and the wire harness 4. The reason why the wire harness 4 is wound more is that the wire harness 4 is fixed to the first lead-out portion 17 by the band member 31 (see FIG. 6), and at this time, the gap becomes larger on the side of the second lead-out portion 20.

When the rubber foam 44 is wound more, as seen in FIG. 11A, it seems that the rubber foam 44 pops out outward on the left side of the drawing, but as illustrated in FIGS. 11B and 11C, it can be understood that the first lead-out portion 17 does not pop out to a large extent in practice since the outwardly bulging tape-winding portion 26 is formed. It is assumed that the pop-out amount is T1. Therefore, it is understood that there is no problem with the winding of the tape 33 (see FIGS. 1 and 2) thereafter. It is understood that the outwardly bulging tape-winding portion 26 is an effective portion for a good outlet structure.

Figure 12A:
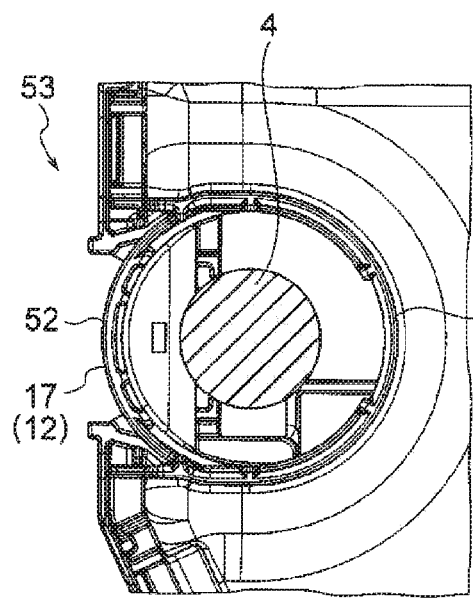
Figure 12B:
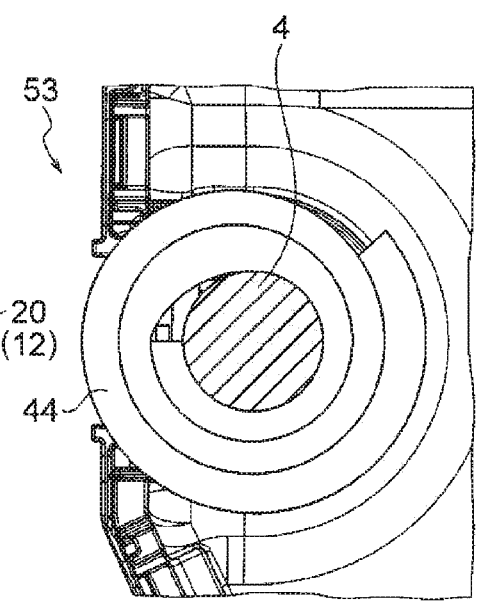
Figure 12C:
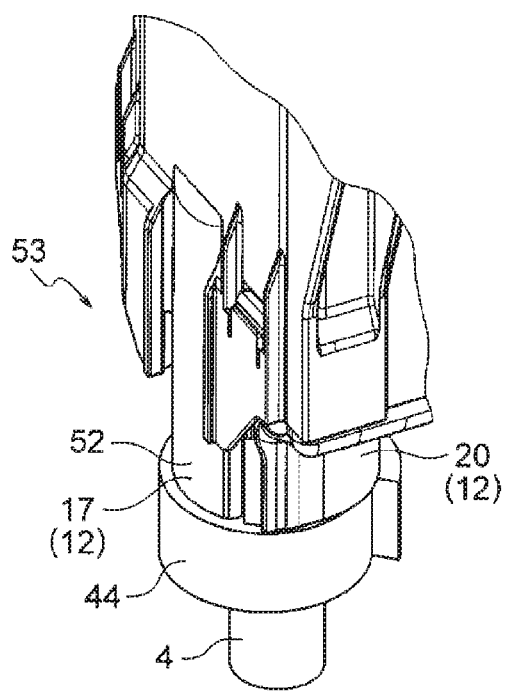
Figure 12D:
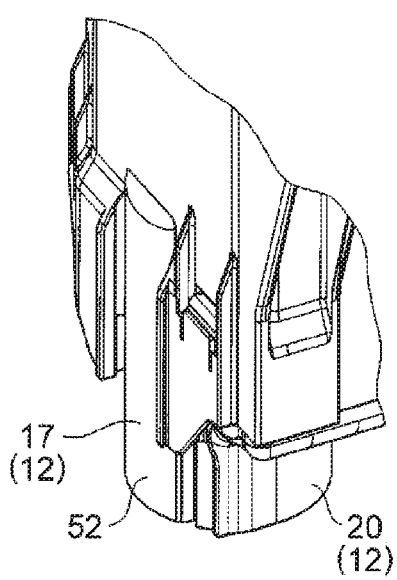
Figure 13A:
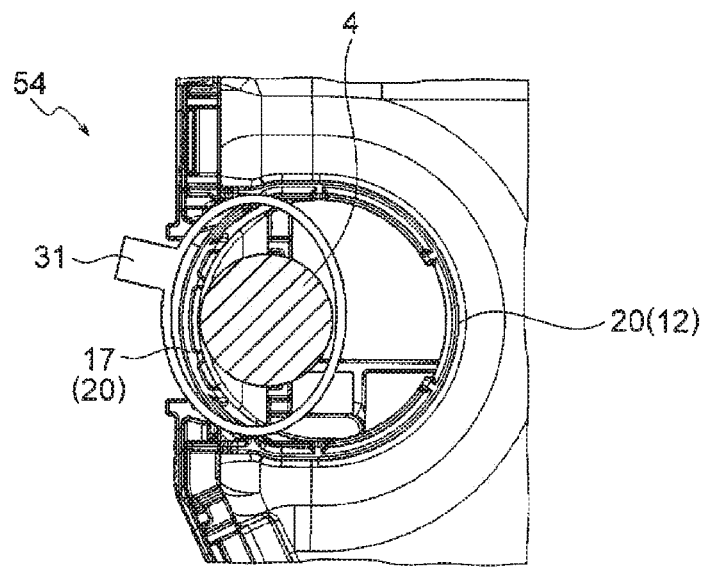
Figure 13B:
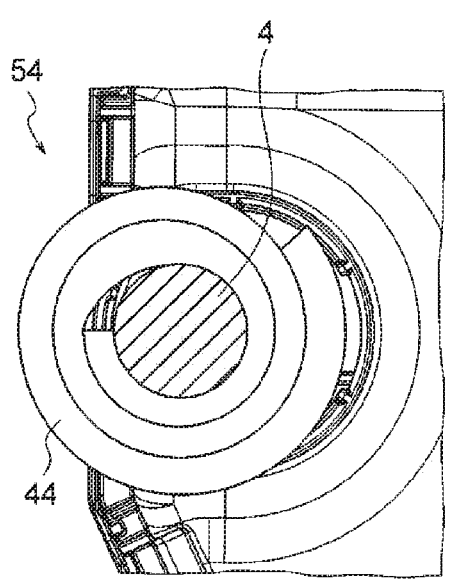
Figure 13C:
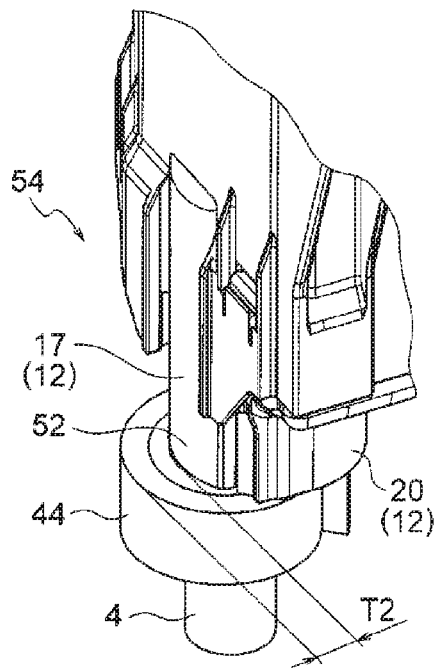

As illustrated in FIGS. 12C and 13C, if the tape-winding portion 52 does not have a shape bulging outward, the following inconvenience will occur.

<Outlet Structures 53 and 54 as Comparative Example>

In FIGS. 12A to 12D, in the outlet structure 53 when the diameter of the wire harness 4 is smaller than that of Example 1, the wire harness 4 is not fixed to the first lead-out portion 17 but becomes in a state of being located at the center position of the lead-out portion 12. In such the outlet structure 53, a larger amount of rubber foams 44 are wound than in Example 1 in order to conceal the gap between the lead-out portion 12 and the wire harness 4, but because the wire harness 4 is located at the center position, the rubber foam 44 does not pop out to the outside to a large extent. However, since the wire harness 4 is not fixed to the first lead-out portion 17, the stability of the wire harness 4 is insufficiently secured, and for example, it is understood that there is a high possibility that inconvenience will occur if vibration is received during running of a vehicle.

In FIGS. 13A to 13C, in an outlet structure 54 when the diameter of the wire harness 4 is smaller than that of Example 1, when the wire harness 4 is fixed to the first lead-out portion 17 and the rubber foam 44 is wound in this state, the rubber foam 44 becomes in a state of popping out outward to a large extent as illustrated in FIGS. 13B and 13C. Assuming that this pop-out amount is T2, it is a state of relationship T2>T1. The large extent of pop-out is because the tape-winding portion 52 does not have a shape bulging outward. Even if the rubber foam 44 is somewhat crushed, the large extent of pop-out hinders winding of the tape 33 (see FIGS. 1 and 2) thereafter, and it is understood that there is a possibility of inconvenience that the tape 33 may not be wound in some cases.

<Effects of Electrical Connection Box 1>

As described above with reference to FIGS. 11A to 11C and 13A to 13C, according to the electrical connection box 1 which is one embodiment of the present invention, since the tape-winding portion 26 bulging outward is formed as illustrated in FIGS. 11A to 11C, winding of the tape 33 (see FIGS. 1 and 2) from the lead-out portion 12 to the wire harness 4 can be performed with good workability.

In addition, it goes without saying that the present invention can be variously modified within a range not changing the scope of the present invention.

The invention claimed is:

1. An electrical connection box comprising:
   a housing comprising a frame and a lower cover configured to be fitted to the frame in a fitting direction,
   wherein at least part of the frame and at least part of the lower cover form a lead-out portion having a tubular shape and protruding toward an outside of the housing,
   wherein an axial direction of the lead-out portion extends along the fitting direction, and the lead-out portion allows a wire harness to be pulled out through the lead out portion, the wire harness comprising an end portion that is to be disposed in an inside of the housing,
   wherein the lead-out portion comprises a plurality of harness contact portions formed on an inner peripheral surface of the lead-out portion and configured to contact the wire harness,
   wherein the plurality of harness contact portions are a plurality of ribs that extend along the fitting direction and are spaced from one another in a circumferential direction of the lead-out portion,
   wherein the lead-out portion comprises a first lead-out portion formed in the frame and a second lead-out portion formed in the lower cover, and
   wherein the first lead-out portion comprises:
      a band-assembling portion to which a band member configured to fix the wire harness to the inner peripheral surface is assembled; and
      a tape-winding portion having an outer diameter in the radial direction larger than that of the band-assembling portion and configured to receive a tape that is wound from the lead-out portion to the wire harness in the axial direction.

2. The electrical connection box according to claim 1, wherein the lead-out portion comprises a base end and a distal end in the axial direction, the distal end being opened toward the outside of the housing,
   wherein a plurality of recessed portions are formed in the inner peripheral surface and adjacent to the plurality of harness contact portions in the circumferential direction, and
   wherein the plurality of recessed portions are formed in a range from an opening edge of the distal end to an intermediate portion between the distal end and the base end in the axial direction, and are recessed toward an outer side in a radial direction of the lead-out portion relative to radially inner ends of the plurality of harness contact portions.

3. The electrical connection box according to claim 2, wherein one of the plurality of recessed portions has a cut portion recessed in a range from the intermediate portion to the base end in the axial direction and configured to communicate with the inside of the housing.

4. A wiring system comprising:
the electrical connection box according to claim 1; and
the wire harness,
wherein the electric connection box includes the end portion of the wire harness to be wired to an automobile.

5. The electrical connection box according to claim 1, wherein the tape-winding portion is closer than the band-assembling portion to a distal end of the first lead-out portion in the axial direction, such that the tape-winding portion is configured to receive the tape without the tape covering the band-assembling portion.

6. The electrical connection box according to claim 5, wherein the tape-winding portion bulges outward, compared to the band-assembling portion, at the distal end of the first lead-out portion.

7. The electrical connection box according to claim 4, wherein
the band-assembling portion includes band-inserting holes that are configured to receive the band member, and
the band-inserting holes extend in the circumferential direction of the lead-out portion to an exterior of the band-assembling portion.

8. The electrical connection box according to claim 1, wherein the first lead-out portion comprises a pair of slits extending along the fitting direction and configured such that the band member runs through each of the pair of slits.

9. The electrical connection box according to claim 1, wherein the second lead-out portion comprises a base end, and
wherein a curved surface is formed in the base end, the curved surface being configured, when the lower cover is being attached to the frame, to contact an outer surface of the wire harness.

* * * * *